C. H. KAUFMANN.
BELT GUARD.
APPLICATION FILED DEC. 26, 1916.

1,271,717.

Patented July 9, 1918.

Witnesses

Inventor
C. H. Kaufmann
by C. A. Snow & Co.
Attorneys

UNITED STATES PATENT OFFICE.

CARL H. KAUFMANN, OF SANTA ANA, CALIFORNIA.

BELT-GUARD.

1,271,717.   Specification of Letters Patent.   Patented July 9, 1918.

Application filed December 26, 1916.  Serial No. 138,869.

*To all whom it may concern:*

Be it known that I, CARL H. KAUFMANN, a citizen of the United States, residing at Santa Ana, in the county of Orange and State of California, have invented a new and useful Belt-Guard, of which the following is a specification.

The present invention relates to a belt guard adapted especially for use upon Ford automobiles, and aims to provide a device of that character which is extremely simple and inexpensive in construction, which can be readily applied, and which is thoroughly effective for holding the fan belt in place.

Considerable trouble has been experienced in keeping the fan belts on the pulleys, especially after the belts have been in use for some time, and an engine may be ruined by overheating it before the driver finds out that the fan is not in operation. The present device has been designed for ready attachment to the end of a Ford automobile, although it can be used upon other engines with appropriate changes, and serves its office in a satisfactory manner, whereby worn belts as well as new ones are properly held in place.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:—

Figure 1:
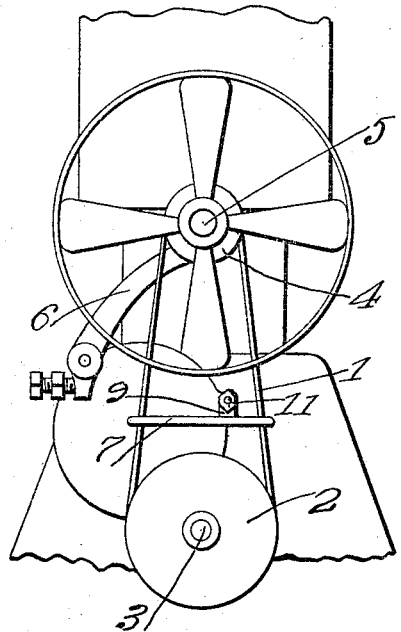
Figure 1 is a fragmental front view of the engine of a Ford automobile, showing the invention applied.
Figure 2:
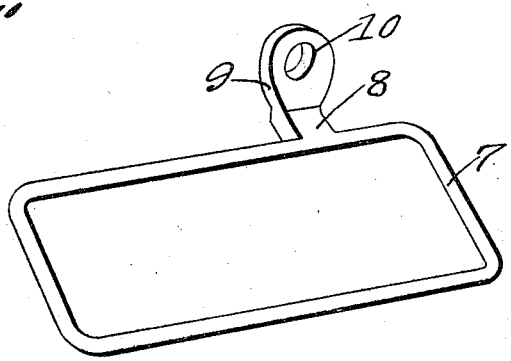
Fig. 2 is a perspective view of the attachment.

In the drawing, there is illustrated the fan belt 1 of the engine of a Ford automobile, which is trained around the driving pulley 2 secured upon the crank shaft 3 and the pulley 4 upon the fan shaft 5 supported by the bracket 6.

The present attachment embodies the rectangular open frame 7 providing the guard for the belt. This frame can be cast from suitable metal or otherwise manufactured, and one longitudinal side bar thereof is provided with an outstanding lug 8 in the plane of the frame and said lug has an ear 9 projecting at right angles therefrom and provided with an aperture 10. The lug 8 and ear 9 are located at one side of the frame nearer one end thereof than the other, and the ear 9 is applicable to a bolt 11 at the forward end of the crank casing immediately above the driving pulley 2. Thus, by removing the nut of the bolt 11, the ear 9 can be placed upon said bolt, and the nut replaced and tightened, thereby clamping the ear 9 in place. Before the nut is tightened, the frame or guard 7 can be adjusted to the desired angle, whereby to hold the belt in place properly. The belt can be readily passed through the frame or loop 7, and when the belt and guard are in place, the runs of the belt are guided between the longitudinal side bars of the frame at the inner sides of the end pieces of the frame or guard. The present device consists of but one part, and no extra fittings are necessary. It has been found that the present device permits of the use of a worn belt, which cannot be otherwise used satisfactorily.

Having thus described the invention, what is claimed as new is:

In a device of the class described, an engine embodying a crank shaft; a crank case extended above the shaft and provided upon its end and adjacent its periphery with an outstanding securing device; a fan shaft journaled above the crank case; a fan on the fan shaft; a belt connecting the shafts; and an open horizontal frame through which both runs of the belt pass, the frame having a rearwardly extended lug provided with an upstanding ear bearing against the forward end of the crank case, the ear having an opening receiving the securing device, whereby the latter will hold the frame rigidly on the crank case.

In testimony that I claim the foregoing as my own, I have hereto affixed my signature in the presence of two witnesses.

CARL H. KAUFMANN.

Witnesses:
  D. N. KELLY,
  SOPHIE POHNDORF.

Copies of this patent may be obtained for five cents each, by addressing the "Commissioner of Patents, Washington, D. C."